US006862342B1

United States Patent
Hua et al.

(10) Patent No.: US 6,862,342 B1
(45) Date of Patent: Mar. 1, 2005

(54) INTELLIGENT-NETWORKED SYSTEM WITH SERVICE FOR NOTIFYING AND HEARING SELECTED E-MAILS VIA A PUBLIC SWITCHED TELEPHONE NETWORK

(75) Inventors: Shiyan Hua, Wheaton, IL (US); Yigang Cai, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/516,267

(22) Filed: Feb. 29, 2000

(51) Int. Cl.[7] .............................................. H04M 11/00
(52) U.S. Cl. .................................... 379/88.13; 345/752
(58) Field of Search ........................ 379/88.13, 88.14, 379/93.24, 201.02, 201.03, 88.15, 88.2, 88.21, 220.01, 221.08, 221.09, 88.12, 88.16, 88.23; 345/752; 709/206

(56) References Cited

U.S. PATENT DOCUMENTS

| | | | | |
|---|---|---|---|---|
| 5,838,768 A | * | 11/1998 | Sumar et al. ............ | 379/88.14 |
| 5,870,454 A | * | 2/1999 | Dahlen .................... | 379/88.13 |
| 5,933,778 A | | 8/1999 | Buhrmann et al. | |
| 5,963,626 A | * | 10/1999 | Nabkel .................... | 379/88.23 |
| 5,978,450 A | | 11/1999 | McAllister et al. | |
| 5,995,594 A | * | 11/1999 | Shaffer et al. ........... | 379/88.12 |
| 6,028,924 A | | 2/2000 | Ram et al. | |
| 6,061,718 A | * | 5/2000 | Nelson ...................... | 709/206 |
| 6,072,862 A | * | 6/2000 | Srinivasan .............. | 379/88.13 |
| 6,222,909 B1 | * | 4/2001 | Qua et al. ............... | 379/88.22 |
| 6,263,064 B1 | * | 7/2001 | O'Neal et al. .......... | 379/201.03 |
| 6,466,653 B1 | * | 10/2002 | Hamrick et al. ........ | 379/88.16 |

FOREIGN PATENT DOCUMENTS

| | | |
|---|---|---|
| EP | 0 508 138 A2 | 10/1992 |
| EP | 0 924 946 A1 | 6/1999 |
| WO | WO 89 12271 | 12/1989 |

OTHER PUBLICATIONS

Robrock, R. B. II, "The Many Faces of the LIDB Data Base," Discovering a New World of Communications. Chicago, Jun 14–18, 1992. Bound together with B0190700, vol. 3, *Proceedings of the International Conference on Communications*, New York, IEEE US, vol. 4, Jun. 14, 1992, pp. 1903–1907.

* cited by examiner

*Primary Examiner*—Fan Tsang
*Assistant Examiner*—Gerald Gauthier

(57) ABSTRACT

An intelligent-networked telecommunication system for audio playing of Electronic Mail ("E-Mail") messages uses the Service Control Point (SCP) of the Intelligent Network (IN) to route e-mail messages directed to subscribing customers to the customer's telephone number when the e-mail header matches the limitations stored in the subscribing customer's profile. The text of the e-mail message is converted to an audio message which can either be heard by the customer when a call is answered, or stored on an answering machine or in a voice mailbox. The present-inventive Notifying and Hearing Selective E-Mails (NHSE) system and method also includes features such as the subscribing customer being able to specify that audio e-mail messages will be truncated to a specified length, sending a special Caller ID message identifying the e-mail sender and subject of the message when the customer also has Caller ID service, and preceding the transmission of the audio e-mail message with a distinctive ringing pattern, to allow a subscribing customer the option of going "off-hook" to listen to the message, or allow the call to go directly to voice mail or an answering machine.

24 Claims, 3 Drawing Sheets

INTELLIGENT-NETWORKED SYSTEM WITH SERVICE FOR NOTIFYING AND HEARING SELECTED E-MAILS VIA A PUBLIC SWITCHED TELEPHONE NETWORK

BACKGROUND OF THE INVENTION

1. Field of the Invention

The present invention generally relates to networks for providing telephone calls, and networks for providing Electronic Mail messages.

2. Background

As is well known in the art, Electronic Mail ("E-Mail") consists of computer generated messages and files by a sending party, which are intended to be electronically transmitted and read by a receiving party.

It is desirable to allow telephone customers to have access to e-mail messages in audio form while they are away from computers. The prior art has attempted to fill this need by providing such systems as the Octel™ Unified Messenger System belonging to Lucent Technologies, Inc. Among the noticeable limitations of that system and others is the fact that e-mail messages are only available through a paging system when a computer is not available to receive the e-mail message. Additionally, these systems require the use of Private Branch Exchange (PBX) systems tied into a server having special software compatible with the particular audio e-mail system. As a result of the special hardware and software requirements, prior art audio e-mail systems are not available for general Public Switched Telephone Network (PSTN) customers.

To that end, it is desirable to provide an audio e-mail system for converting text messages to audio messages, which system is potentially available to the masses of PSTN customers who have e-mail accounts. And, this system should not require the customer to install any special hardware or software.

SUMMARY OF THE INVENTION

In view of the aforementioned problems and deficiencies of the prior art, the present invention provides in a telecommunication system, a method of providing to a subscriber, an audio message converted from an electronic text message. The several steps of the method include providing a plurality of telephonic devices for initiating and receiving telephone calls, and providing an automated intelligent network (IN) for the automated processing of telephone calls in the telecommunication system. The IN at least includes a service control point (SCP) at least including control logic and an SCP database, and the IN at least includes a plurality of switches coupled to telephone devices.

The method further includes the steps of, via the switches, routing calls authorized by the SCP to a destination number specified by a calling party, via the IN and the SCP, receiving an electronic mail (e-mail) message specifying a subscriber as the intended recipient of the e-mail message, and terminating a telephone call generated by the IN to a telephone number specified by the subscriber in the SCP database.

The method also includes the steps of converting text in the e-mail message to an audio message, and transmitting during the telephone call, an outgoing message at least including the audio message.

The present invention also provides a telecommunication system adapted to provide to a subscriber, an audio message converted from an electronic text message. The system has several elements, including a plurality of telephonic devices adapted to initiate and receive telephone calls, and an IN adapted to automatically process telephone calls in the telecommunication system, the IN at least including an SCP having control logic and an SCP database, and the IN at least including a plurality of switches coupled to telephone devices. The system also at least includes a text-to-audio converter adapted to convert text in an e-mail message to an audio message.

The switches are adapted to route calls authorized by the SCP to a destination number specified by a calling party, while the IN and SCP are adapted to receive an e-mail message specifying a subscriber as the intended recipient of the e-mail message. The IN is also adapted to generate and terminate a telephone call to a telephone number specified by the subscriber in the SCP database, and to cause to be transmitted during the telephone call, an outgoing message at least including the audio message.

BRIEF DESCRIPTION OF THE DRAWING FIGURES

Features and advantages of the present invention will become apparent to those skilled in the art from the description below, with reference to the following drawing figures, in which.

DESCRIPTION OF THE PREFERRED EMBODIMENTS

1. NHSE Basic Hardware and Operation

Figure 1:
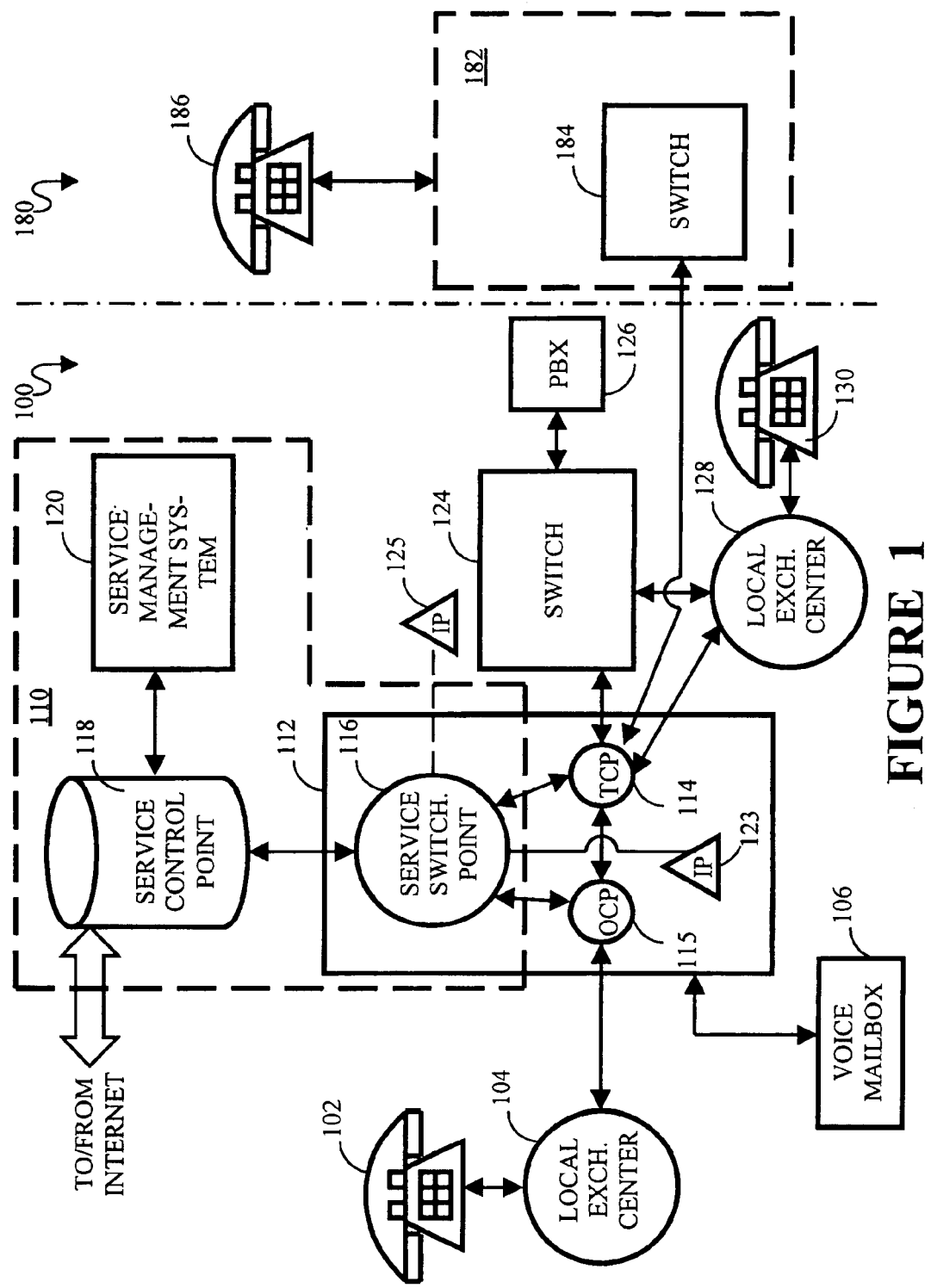
FIG. 1 is a schematic block diagram of the basic hardware for the intelligent-networked telecommunication system for implementing the present-inventive service for Notifying and Hearing Selected E-mails (NHSE)

The basic hardware of the telephone service system 100/180 capable of implementing Notifying and Hearing Selected E-Mails (NHSE) service is illustrated in FIG. 1. The present invention is compatible with PSTNs, and requires no additional hardware or software for telephone customers subscribing to the service.

Used in this specification, the terms "termination" and "terminating" refer to connecting a call to a destination number.

The system 100/180 combines a domestic network 100, as in the United States, for example, and a foreign network 180, as in Europe, for example. The system 100/180 includes a variety of telephonic devices as would be common in a general telephone system. For example, a user can connect to the network 100 using such devices as common telephones 102, 130 and 186. Also, a user can attempt to complete a telephone call using a telephone that is part of a private branch exchange (PBX) 126 as is known in the art. The telephones typically include alphanumeric keypads for inputting Dual-Tone-Multi-Frequency (DTMF) signals, or the like, as is common.

The telephone lines in the system 100/180 are initially connected to Local Exchange Centers (LECs), 104, 128, etc., as is also known in the art.

The system 100/180 includes intelligent networks 110 and 182. Intelligent Networks (INs) are software and hardware hybrids that are used to automatically process telephone calls in a telephone system. A service control point (SCP) 118 in the IN provides the logic that governs call handling, etc., and contains a database that stores useful information needed for various transactions. The IN also contains several switches (e.g., 112, 124 and 184) for both receiving calls to the network and physically routing calls to destination numbers. Each switch contains a Service Switching Point (SSP) such as the one 116 for interfacing with calling parties and performing the actual call routing under the instruction of the SCP.

The SCP and SSP may be connected with a high-speed link utilizing, for example, the Intelligent Network Application Protocol (INAP), as approved by the European Telecommunications Standards Institute (ETSI) or International Telecommunication Unit (ITU). It will be appreciated by those is skilled in the art that the SCP 118 can be implemented as a networked database, not limited to one geographic location.

A Service Management System (SMS) 120 is used by customers to establish parameters for various services available (such as the NHSE service of the present invention), security codes, and any restrictions on the use of a telephone line or account.

An Originating Call Processor (OCP) such as the one 115 is part of each switch, and transfers a received call to the switch's SSP. A Terminating Call Processor (TCP) such as the one 114 is also part of each switch, and handles the termination of call processing to connect it to the destination number. The interface between the SSP 116 and the OCP 115, and the interface between the SSP and TCP use a switch internal message flow, or a common channel signaling link or any type of protocol, as will be appreciated by those skilled in the art.

As is common in present-day telephone systems, a voice mailbox 106 allows the calling party of unanswered terminated calls to leave a voice mail message for the called party.

The switches (112, 124, 184, etc.) also have associated Intelligent Peripherals (IPs) for the purpose of playing announcement messages and prompting and collecting user information. The IPs can be stand-alone units (125), or units integrated (123) within the associated switch, or a unit within the Service Node (SN) (not shown in FIG. 1). In the preferred embodiment, the functions of the IPs include converting the text of e-mail messages to audio messages, and played back to the intended subscribing customer.

Figure 2:
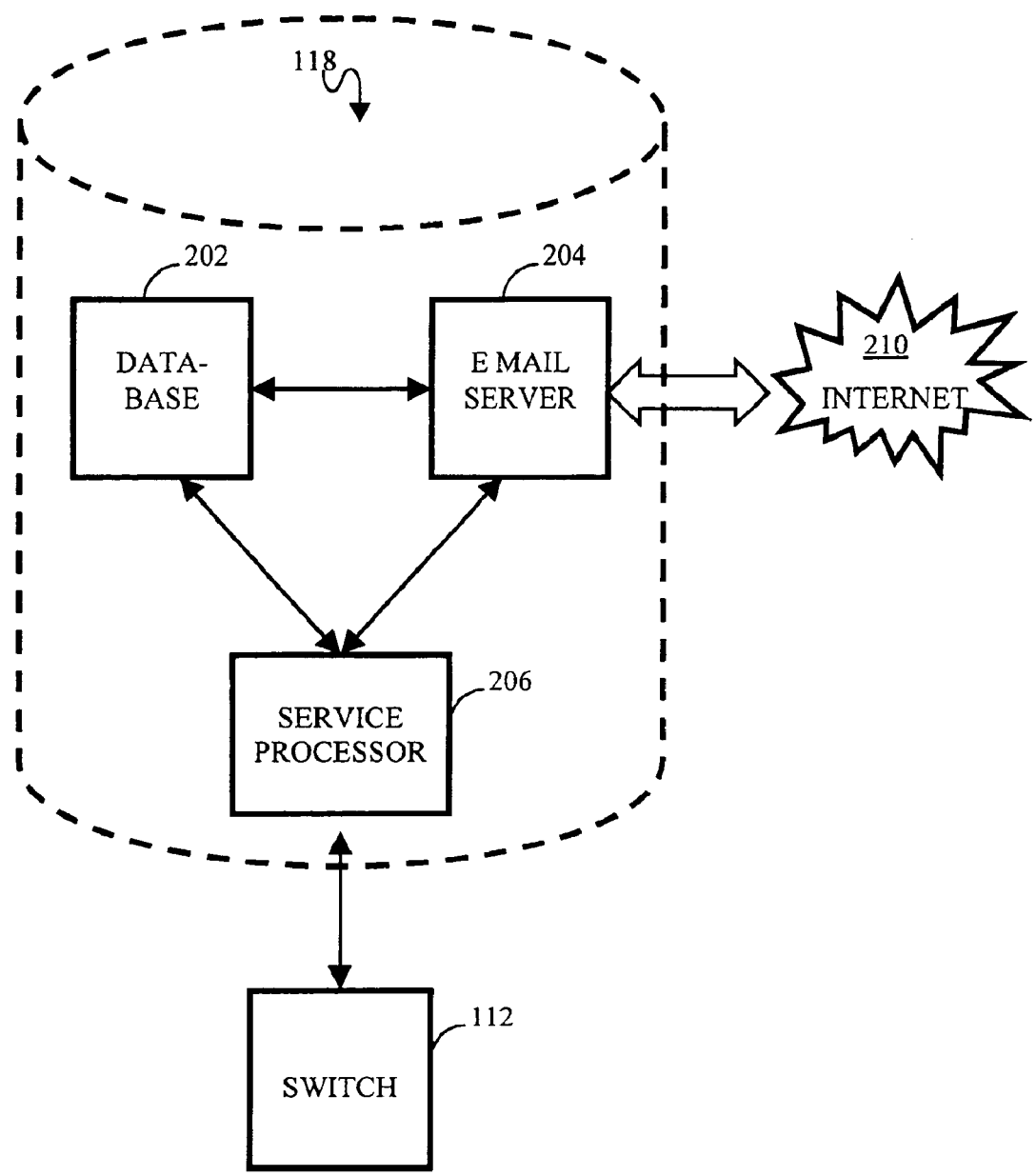
FIG. 2 is a schematic block diagram the Service Control Point (SCP) of the Intelligent Network (IN) of the present-inventive telecommunication system.

As can be seen from FIGS. 1 and 2, the SCP 118 is connected to a wide area network such as the Internet 210 to monitor e-mail transmissions for those e-mail messages intended for customers subscribing to the present-inventive NHSE service. The SCP 118 connects to the Internet 210 by way of an e-mail server 204. An SCP database 206 stores information for the operation of the SCP and various services, including NHSE. The SCP database also contains custom data entered by subscribing customers reflecting the customers' choices for handling e-mail messages received by the system 100/180. A service processor or SCP Control Unit 206 controls the operation of the SCP and various services including the present-inventive NHSE service.

When a customer subscribes to the present-inventive NHSE service, he/she may establish service by following instructions after dialing a predetermined telephone number; or by sending a registration e-mail to the SCP or the SMS e-mail server, or registration through a service web site on the Internet. The customer can choose from among various menu items after receiving prompts. A subscribing customer establishes an NHSE list to be stored in the SCP database.

In the preferred embodiment, the subscriber's NHSE list includes his/her e-mail address, the telephone number where e-mail messages are to be forwarded, e-mail truncation information indicating whether the subscriber desires that e-mail messages transmitted shall be truncated, and the truncation length, and other selective information.

The selective information includes various items such as a list of senders' e-mail addresses for messages from those senders that the subscriber would like to have converted and transmitted by the NHSE service, if desired, keywords in the sender's e-mail address that will activate the service, keywords in a received e-mail's subject or body that will activate the service, the sending date or keywords in the sending date of the e-mail which will activate the service, and which level or priority will activate the service (for example, the subscriber may desire that only messages marked "urgent" should be forwarded by the NHSE service). It will be appreciated by those skilled in the art having read the above description that the subscriber may simply elect to have all e-mail messages forwarded under the present-inventive NHSE service, if desired.

After the audio e-mail message is played during a terminated telephone call, the system can give the subscriber the opportunity to input a code from a menu to have the message stored directly into voice mail for customers also having a voice mailbox maintained by the system. For example, the announcement after the audio e-mail message can state: "If you would like to save this e-mail message in your voice mailbox, please press '9'."

The system can also give the customer the opportunity to have the e-mail message repeated one or more times. This may allow customers who have integrated telephone/ answering machines to record the next playing of the e-mail message.

The present inventive system and method briefly operate as follows. When the SCP detects an e-mail message intended for one of the NHSE subscribers, the SCP database is queried for handling instructions. The header information in the e-mail message is compared with the intended customer's NHSE list to determine whether a match exists. If a match exists, the SCP determines whether the subscriber also has Caller ID service. If so, the SCP constructs Caller ID header information to send to the subscriber's telephone number. The Caller ID information can include an indication that an e-mail message is being sent, the sender's e-mail address, and the subject of the e-mail (which can be truncated if necessary).

When the e-mail is forwarded to the subscriber's telephone number, it is preceded by a distinctive ringing pattern, allowing a subscriber to either answer the telephone and hear the e-mail message, or ignore the call and have the message stored by an answering device or in voice mail. Along with the distinctive ringing pattern, the subscriber's telephone number also receives Caller ID information identifying the e-mail sender's address and the e-mail subject.

If the subscriber has chosen a truncation option, the e-mail message is truncated according to the subscriber's truncation instructions.

The intelligent peripheral of the SSP serving the subscriber converts the text of the e-mail message into an audio message. After a call from the SCP to the subscriber is "terminated," the audio version of the e-mail message is played for the subscriber (or to default mechanisms such as an answering machine or voice mail) by the intelligent peripheral.

2. NHSE Algorithm Description

Figure 3:
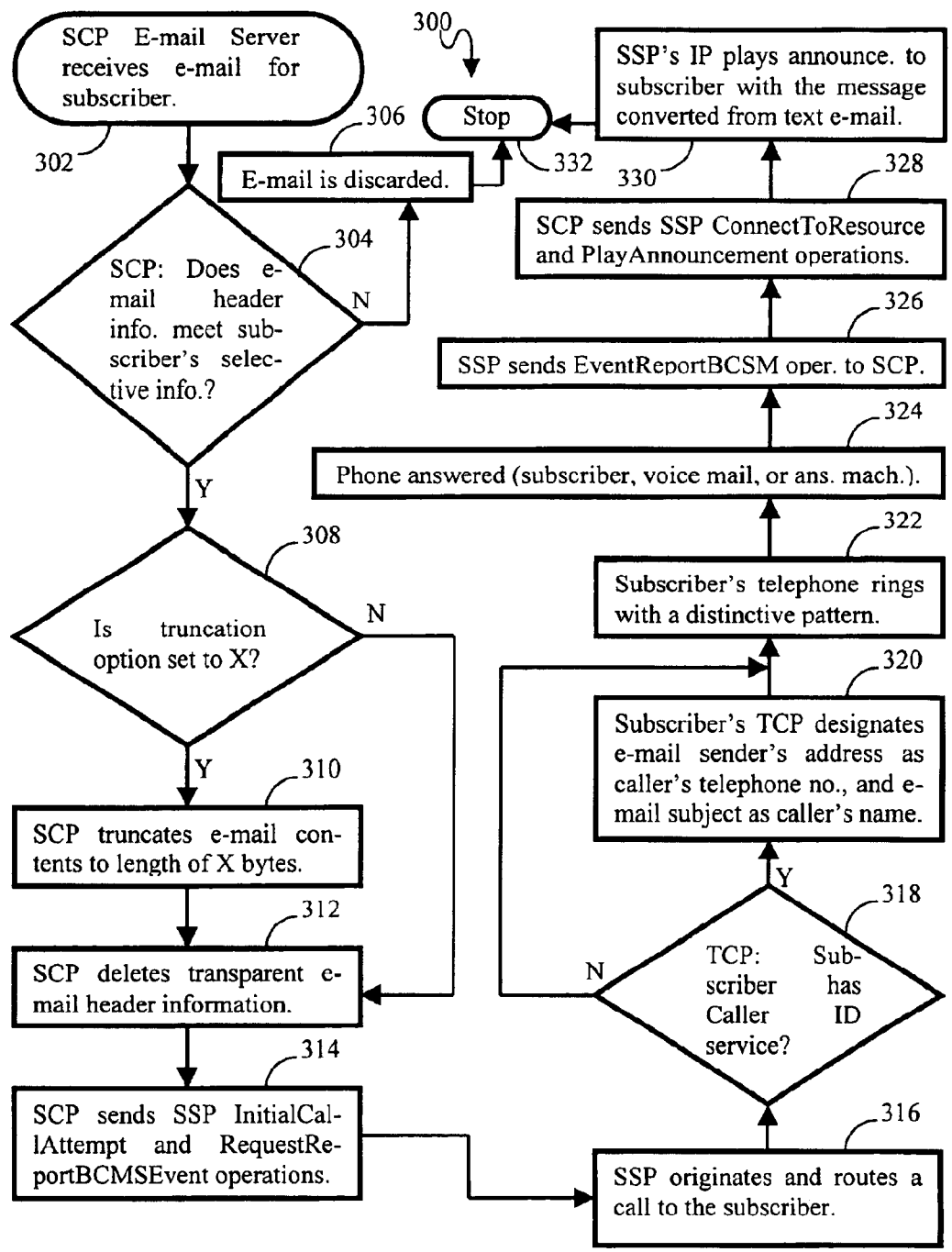
FIG. 3 is a flowchart/algorithm detailing the handling of an e-mail message by the present-inventive telecommunication system.

The handling of an e-mail message by the present-inventive Notifying and Hearing Selected E-Mails (NHSE) service is detailed below, with reference to the flowchart of FIG. 3.

At the beginning step (302) of the algorithm 300, the SCP receives an e-mail message from the Internet indicating an NHSE subscriber as the intended recipient. In Step 304, the SCP determines whether information in the e-mail header meets the forwarding requirements in the subscriber's NHSE list information. If not, the e-mail is discarded by the NHSE system (although the e-mail is still passed to the appropriate Internet Service Provider in the preferred embodiment) in Steps 306 and 322, with no further action.

If the e-mail message is to be forwarded to the customer, the SCP checks the truncation option, and truncates the e-mail message accordingly (Steps 308 and 310). The e-mail header information is deleted in Step 312. To begin the transfer of the e-mail message to the subscriber, the SCP sends an InitialCallAttempt operation to the SSP (Step 314). Included in the InitialCallAttempt are the Destination Routing Address (DestinationRoutingAddress), which is the telephone number designated by the subscriber for receiving NHSE e-mail messages, and the Alerting Pattern (AlertingPattern) in the form of a distinctive ringing pattern indicating that a telephone call contains an NHSE e-mail message. The SCP also sends a RequestReportBCSM operation to the SSP requesting an answer event report.

In response to the operations sent to it in Step 314, the SSP uses the Destination Routing Address to originate and route a telephone call to the subscriber (Step 316). In Step 318 the TCP determines whether the subscriber also has Caller ID service. If so, the TCP prepares a Caller ID information header including the e-mail sender's e-mail address as the originating telephone number, and the e-mail subject in place of the calling party's name (Step 320).

In Step 322 the subscriber's telephone rings with the distinctive ringing pattern for the NHSE service. When the telephone is answered in Step 324 (either by the subscriber, an answering machine, or voice mail, for example), the SSP sends an EventReportBCSM operation to the SCP (Step 326). Upon receiving this latter operation, the SCP sends ConnectToResource and PlayAnnouncement operations back to the SSP (Step 328). Along with these operations, the SCP also sends the e-mail message text. The ConnectToResource operation connects the subscriber's line to the intelligent peripheral. The PlayAnnouncement operation causes the IP to convert the text of the e-mail message into an audio message, and to playback the message to the subscriber (Step 330).

The NHSE algorithm 300 ends with Step 332. After the audio e-mail message is played, the call can continue to be processed as any other call.

Variations and modifications of the present invention are possible, given the above description. However, all variations and modifications which are obvious to those skilled in the art to which the present invention pertains are considered to be within the scope of the protection granted by this Letters Patent.

It is noted that nothing in the present invention is inconsistent with, nor need interfere with normal e-mail operation. That is, all e-mails sent over the Internet will also continue to be handled by Internet Service Providers (ISPs) and forwarded to a subscriber's computer or server as per usual, unless the subscriber dictates otherwise. Therefore, the present-inventive NHSE service is a supplement to typical e-mail service in its preferred use, although NHSE service may serve as a subscriber's primary means of e-mail receipt in alternative uses.

What is claimed is:

1. A method of providing an electronic mail notification and delivery service for a subscriber, the method comprising the steps of:

storing in a network database the subscriber's electronic mail handling instructions, wherein the handling instructions are customizable by the subscriber and comprise at least one of the subscriber's electronic mail address, the subscriber's designated telephone for receiving electronic mail, the subscriber's electronic mail truncation instructions, a list of the subscriber's e-mail addresses for messages from those senders that the subscriber would like to receive, a plurality of keywords in a sender's electronic mail address that will activate the service, a plurality of keywords in a received electronic mail message's subject or body that will activate the service, and a priority level that will activate the service;

receiving an electronic mail message from a sender via a network element, the message specifying the subscriber as an intended recipient of the electronic mail message;

comparing information in the electronic mail message to the handling instructions stored in the network database for the subscriber;

converting textual content in the electronic mail message to an audio message;

truncating the audio message according to the truncation instructions, wherein the truncation instructions comprise which messages are to be truncated and the truncation length; and transmitting the audio message to the designated telephone.

2. The method defined in claim 1, further comprising the steps of:

determining of whether the subscriber also subscribes to a caller identification service for providing caller identification information; and transmitting caller identification information to the telephone designated by the subscriber, the information including an indication that a telephone call received by the subscriber contains an electronic mail message.

3. The method defined in claim 2, wherein the caller identification information further comprises the identity of the sender of the electronic mail message.

4. The method defined in claim 2, wherein the caller identification information further comprises a subject matter identifier of the electronic mail message.

5. The method defined in claim 2, wherein the caller identification information further comprises a portion of the text of the electronic mail message.

6. The method defined in claim 1, further comprising the step of sending a distinctive ringing pattern corresponding to the inclusion of an electronic mail message in the call.

7. The method defined in claim 1, wherein the email message is not transmitted to a subscriber unless header information in the electronic mail message indicates that the message is urgent.

8. The method defined in claim 1, further comprising the steps of:

prompting the subscriber to enter a feature activation code, the code comprising a signal to the telecommunication network to store the audio message in a voice mailbox; and storing the audio message in a voice mail box upon receiving the code.

9. The method defined in claim 1, further comprising the steps of:

prompting the subscriber to enter a feature activation code, the code comprising a signal to the telecommunication network to repeat the playing of the audio message; and repeating the playing of the audio message upon receiving the feature activation code.

10. The method defined in claim 1, further comprising an automated intelligent network for the automated processing of telephone calls.

11. The method defined in claim 10, wherein the network database comprises a service control point database in the intelligent network.

12. A system for providing to a subscriber an audio message converted from an electronic mail message, the system comprising:

a service control point in an Intelligent Network having call handling control logic and a database for storing call handling information and electronic mail handling instructions, the service control point being adapted to compare header information in an electronic mail message received by the service control point to electronic mail handling instructions stored in the database and to route the electronic mail message to a telephone number specified by the intended subscriber when the handling instructions so indicate, wherein the electronic mail handling instructions are customizable by the subscriber and comprise at least one of the subscriber's electronic mail address, the subscriber's designated telephone for receiving electronic mail, the subscriber's electronic mail truncation instructions, a list of the subscriber's e-mail addresses for messages from those senders that the subscriber would like to receive, a plurality of keywords in a sender's electronic mail address that will activate the service, a plurality of keywords in a received electronic mail message's subject or body that will activate the service, and a priority level that will activate the service; and a text-to-audio converter adapted to convert text in an electronic mail message to an audio message.

13. The system defined in claim 12, wherein the electronic mail message is truncated according to the truncation instructions specified by the subscriber.

14. A system for providing an electronic mail message delivery service for a subscriber, the method comprising the steps of:

means for storing the subscriber's electronic mail handling instructions, wherein the handling instructions are customizable by the subscriber and comprise at least one of the subscriber's electronic mail address, the subscriber's designated telephone for receiving electronic mail, the subscriber's electronic mail truncation instructions, a list of the subscriber's e-mail addresses for messages from those senders that the subscriber would like to receive, a plurality of keywords in a sender's electronic mail address that will activate the service, a plurality of keywords in a received electronic mail message's subject or body that will activate the service, and a priority level that will activate the service;

means for receiving an electronic mail message from a sender via a network element, the message specifying the subscriber as an intended recipient of the electronic mail message;

means for comparing information in the electronic mail message to the handling instructions stored in the network database for the subscriber;

means for converting textual content in the electronic mail message to an audio message;

means for truncating the audio message according to the truncation instructions, wherein the truncation instructions comprise which messages are to be truncated and the truncation length; and means for transmitting the audio message to the designated telephone.

15. The system defined in claim 14, further comprising:

means for determining of whether the subscriber also subscribes to a caller identification service for providing caller identification information; and means for transmitting caller identification information to the telephone designated by the subscriber, the information including an indication that a telephone call received by the subscriber contains an electronic mail message.

16. The system defined in claim 15, wherein the caller identification information further comprises the identity of the sender of the electronic mail message.

17. The system defined in claim 16, wherein the caller identification information further comprises a subject matter identifier of the electronic mail message.

18. The system defined in claim 17, wherein the caller identification information further comprises a portion of the text of the electronic mail message.

19. The system defined in claim 14, further comprising the step of sending a distinctive ringing pattern corresponding to the inclusion of an electronic mail message in the call.

20. The system defined in claim 19, wherein the email message is not transmitted to a subscriber unless priority level is urgent.

21. The system defined in claim 20, further comprising:

means for prompting the subscriber to enter a feature activation code, the code comprising a signal to the telecommunication network to store the audio message in a voice mailbox; and means for storing the audio message in a voice mail box upon receiving the code.

22. The system defined in claim 20, further comprising:

means for prompting the subscriber to enter a feature activation code, the code comprising a signal to the telecommunication network to repeat the playing of the audio message; and means for repeating the playing of the audio message upon receiving the feature activation code.

23. The system defined in claim 14, further comprising an automated intelligent network for the automated processing of telephone calls in the network.

24. The system defined in claim 23, wherein the means for storing the subscriber's electronic mail handling instructions comprises a service control point database in the intelligent network.

* * * * *